May 11, 1937. N. B. HENLEY 2,080,311
MEASURING AND DISPENSING MACHINE
Filed Dec. 5, 1936  2 Sheets-Sheet 1
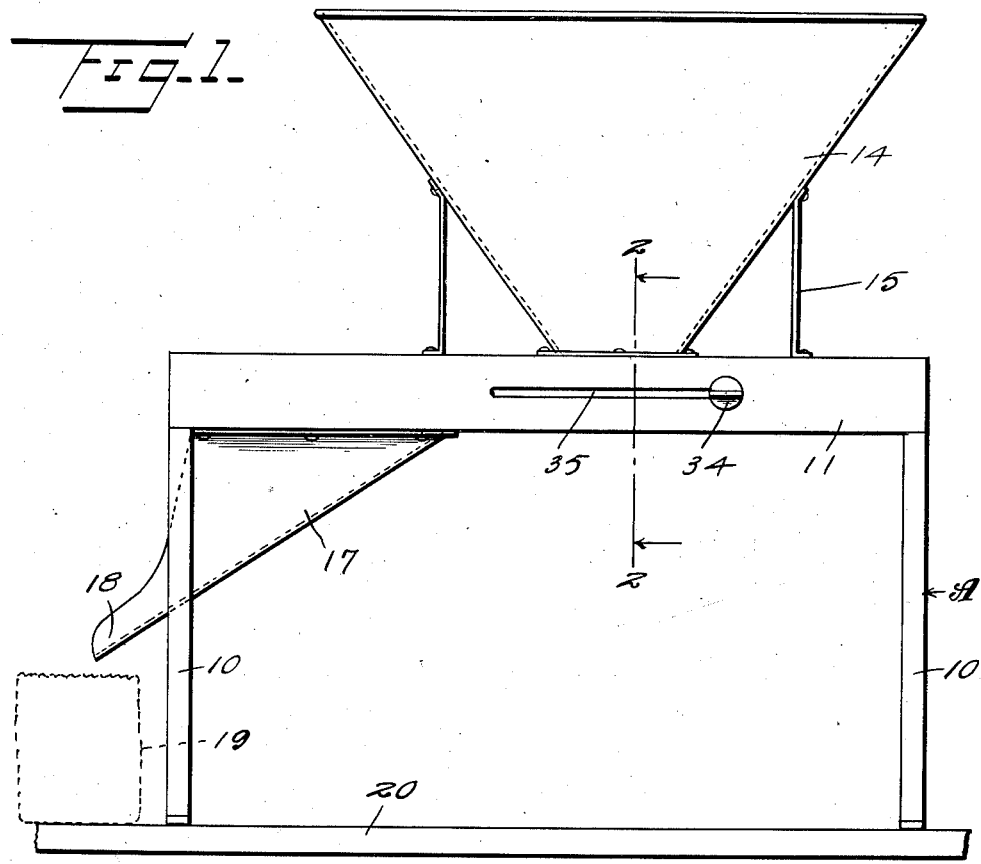
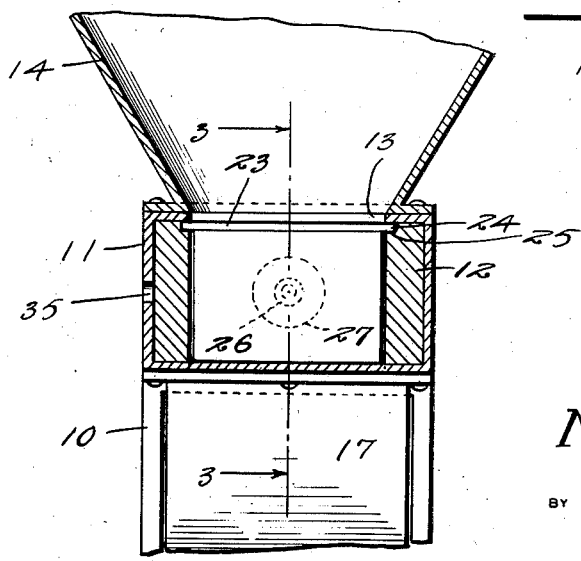
N. B. Henley
INVENTOR
BY Victor J. Evans & Co.
ATTORNEY May 11, 1937.     N. B. HENLEY     2,080,311
MEASURING AND DISPENSING MACHINE
Filed Dec. 5, 1936     2 Sheets-Sheet 2
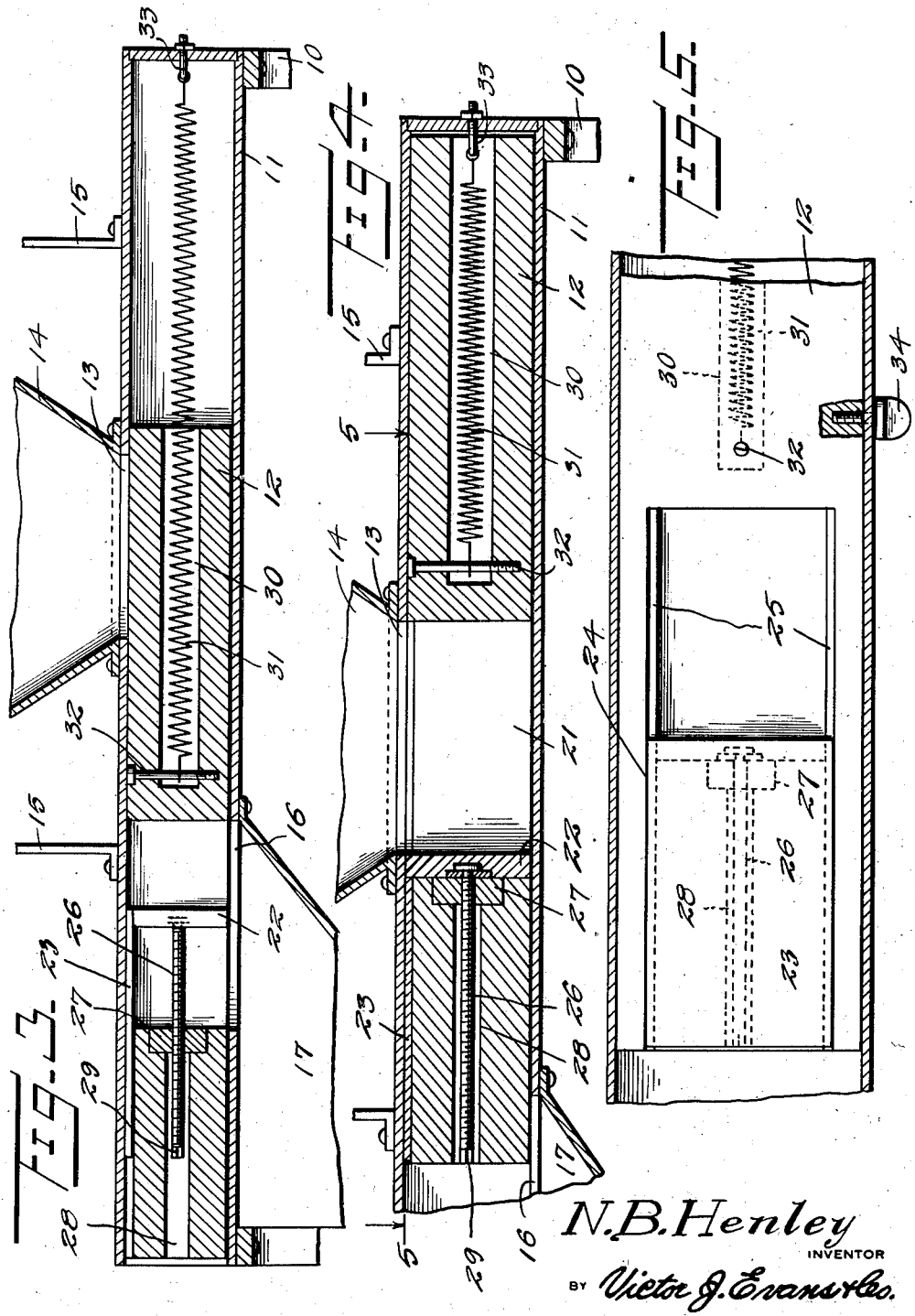
N.B. Henley
INVENTOR
BY Victor J. Evans & Co.
ATTORNEY Patented May 11, 1937

2,080,311

UNITED STATES PATENT OFFICE 2,080,311

MEASURING AND DISPENSING MACHINE

Norris B. Henley, Fort Myers, Fla.

Application December 5, 1936, Serial No. 114,478

1 Claim. (Cl. 221—105)

The invention relates to a measuring and dispensing machine and more especially to an adjustable dispenser machine.

The primary object of the invention is the provision of a machine of this character, wherein through the use of a delivery slide material from a feed hopper can be readily and conveniently dispensed in determined quantity, thereby enabling the packaging or bagging of determined quantities in an easy and convenient manner.

Another object of the invention is the provision of a machine of this character, wherein the slide is equipped with an adjustable gauge head for varying the dispensing capacity of such slide and also the latter is mounted in a novel manner so that on manipulation material can be measured within the machine and conveniently dispensed therefrom.

A further object of the invention is the provision of a machine of this character, which is simple in its construction, thoroughly reliable and effective in operation, convenient for the measuring of different determined quantities of material with dispatch so that such material in the measured quantities thereof can be packaged or bagged expeditiously, readily and easily adjusted and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claim hereunto appended.

In the accompanying drawings:

Figure 1 is a side elevation of the machine constructed in accordance with the invention.

Figure 2 is a fragmentary sectional view on the line 2—2 of Figure 1 looking in the direction of the arrows.

Figure 3 is a fragmentary sectional view taken on the line 3—3 of Figure 2 looking in the direction of the arrows.

Figure 4 is a view similar to Figure 1 showing the parts in a different position.

Figure 5 is a sectional view on the line 5—5 of Figure 4 looking in the direction of the arrows.

Similar reference characters indicate corresponding parts throughout the several views in the drawings.

Referring to the drawings in detail, the machine constituting the present invention comprises a stand A including end uprights 10 and an upper horizontally arranged body 11 forming an enclosure for a dispensing slide 12 which will be hereinafter fully described.

Formed in the top of the body 11 is an inlet opening 13 leading from a feed hopper 14 which is fixed to and rises from this body, being braced by upright or perpendicular brackets 15 fixed to the said body and hopper, respectively. Adapted to be accommodated within the hopper 14 is the material to be measured and dispensed by the machine.

Formed in the bottom of the body 11 offset with respect to the inlet opening 13 is a discharge opening 16 communicative with a delivery chute 17 having a discharge mouth or spout 18 for directing the dispensed material and the measured quantity thereof into a bag or receiver 19 removably placed upon the base 20 of the stand as is shown by dotted lines in Figure 1 of the drawings.

The slide 12 is formed intermediate thereof with a pocket or opening 21, its normal size being of a maximum capacity for the dispensing of a maximum quantity of material by the machine. Working within this pocket or opening 21 and located at one end thereof is a gauge head 22 which at its upper edge has formed therewith a cover extension 23 counter-seated in the top of the slide with the longer side edges 24 thereof slidably fitted upon track ledges 25 as built in the slide 12. The gauge head 22 has swiveled therein one end of an adjusting screw 26 threaded in a nut 27 countersunk in the slide 12 to be flush with the end of the pocket or opening 21 therein next to the head 22. This screw 26 plays through a bore 28 provided in the slide 12 and opening through one end thereof so that a key (not shown) can engage with a flat faced end 29 of said screw to permit easy adjustment of the head 22 which on adjustment thereof varies the capacity of the pocket or opening 21 in the slide 12 and in this manner different determined quantities of material admitted to the pocket or opening 21 may be measured as the occasion may require. The material admitted to the pocket or opening 21 is fed from the hopper 14 when the slide 12 is in one position within the body 11 of the machine. The extension 23 on the head 22 operates as a gate or a shutoff for the opening 13 between the hopper 14 and the body 11 of the machine to avoid the spilling or escaping of the material from the hopper back of the head 22 when the latter is set to gauge a determined quantity of material admitted within the pocket or opening 21 within the slide 12.

The slide 12 is formed with a socket 30 accommodating therein a coiled retractile spring 31 which is anchored within this socket 30 by a pin 32 at one end of said spring while the other end of the spring is attached to an eye 33 fixed to the end next to the said slide of the body 11 and this spring functions to retract the slide 12 for the bringing of the pocket or opening 21 therein into register with the opening 13 for the forwarding of material from the hopper 14 into such pocket or opening 21 so that a determined quantity of the material can be dispensed when the pocket or opening 21 has been brought to register with the chute 17 on the shifting of the slide 12.

The slide 12 has fitted therewith a finger grip 34 which extends laterally through a slot 35 in one side of the body 11 so that the said finger grip 34 can be manually grasped for the shifting of the slide 12 in the body 11 for dispensing purposes against the resistance of the spring 31 connected with said slide.

By adjustment of the head 22 in the pocket or opening 21 in the slide 12 the filling capacity of this pocket or opening can be altered or changed so that material let into the same can be measured into a determined quantity and this measured quantity may be conveniently dispensed through the chute 17 for the packaging or bagging of the same.

What is claimed is:

A measuring and dispensing machine comprising a body forming an enclosure, a dispensing slide fitting said body and having a material receiving opening, a hopper on the body for delivering material to said material receiving opening, a gage head fitting said opening and having a cover extension, the slide being formed with a seat accommodating said cover extension to have the latter flush with one side of the slide, a feed screw swiveled in the gage head and threaded in the slide and having an outer tool engaging end accessible through one end of the slide, and a spring connected with the slide and body for normally holding the said slide in a position for its opening to register with the hopper.

NORRIS B. HENLEY.